Aug. 23, 1960    E. M. DELORAINE ET AL    2,950,400
PROTECTIVE CIRCUIT FOR RADIO REPEATER
Filed March 30, 1942    2 Sheets-Sheet 1
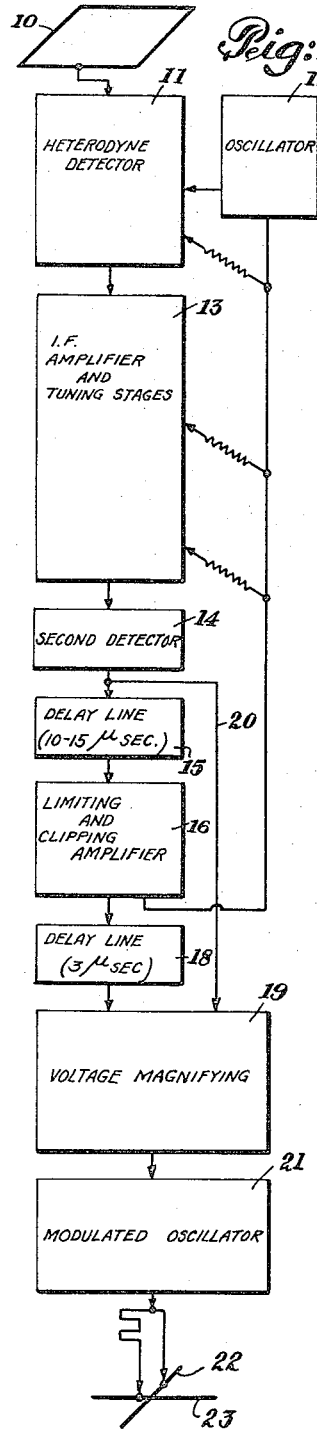
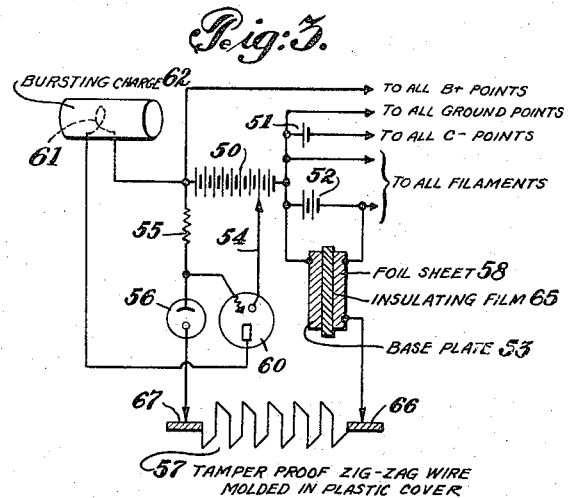
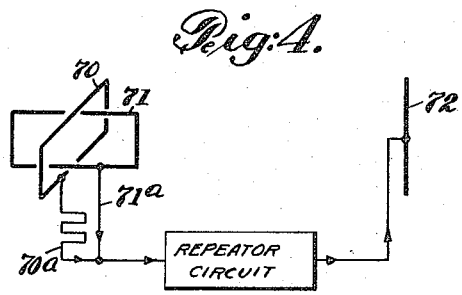
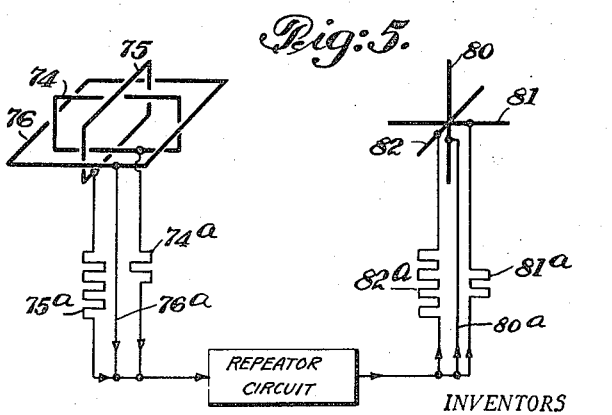
INVENTORS
EDMOND M. DELORAINE
HENRI G. BUSIGNIES
PAUL G. CHEVIGNY
BY R. P. Morris
ATTORNEY INVENTORS
EDMOND M. DELORAINE
HENRI G. BUSIGNIES
PAUL G. CHEVIGNY
BY R.P. Morris
ATTORNEY

2,950,400

PROTECTIVE CIRCUIT FOR RADIO REPEATER

Edmond M. Deloraine, New York, Henri G. Busignies, Forest Hills, and Paul G. Chevigny, New York, N.Y., assignors to International Telephone and Telegraph Corporation, a corporation of Maryland Filed Mar. 30, 1942, Ser. No. 436,906

12 Claims. (Cl. 307—149)

The present invention relates to self-destruction equipment for secret electric apparatuses and more particularly to such equipment for use on very light battery-powered apparatuses supported by balloons.

It is an object of our invention to provide such self-destruction equipment which shall be light enough to be incorporated in an electric apparatus intended to be carried by a small balloon.

It is also an object of our invention to provide self-destruction equipment which shall be easy to manufacture and low in cost while not adding more than a very few ounces to the apparatus in which it is incorporated.

It is a further object to attain such lightness and cheapness and facility of manufacture without sacrificing precision and reliability of operation.

It is a further object to provide self-destruction equipment which shall not require any additional batteries other than those required for the apparatus to be destroyed, and which shall require only a negligible energy from such batteries whereby substantially no additional battery capacity is required. In particular, it is an object to provide an apparatus with means which shall destroy the apparatus in response to a drop in voltage in the batteries of the apparatus to be destroyed and which shall further be arranged to destroy apparatus in response to an attempt to open the apparatus for examination.

It is also an object of our invention to provide a destruction controlling equipment which shall accurately operate at a given battery voltage independent of jars and jolts or of changes of temperature or pressure.

Other features and objects of our invention will appear from the following detailed description which is to be read in conjunction with the attached drawings in which Fig. 1 is a block diagram of an echo-producing apparatus embodying the invention;

Fig. 3 is a schematic diagram of the circuit arrangement for producing self-destruction of the apparatus;

Figs. 4 and 5 illustrate alternative antenna arrangements capable of use in the apparatus of Figs. 1 and 2.

Figure 2:
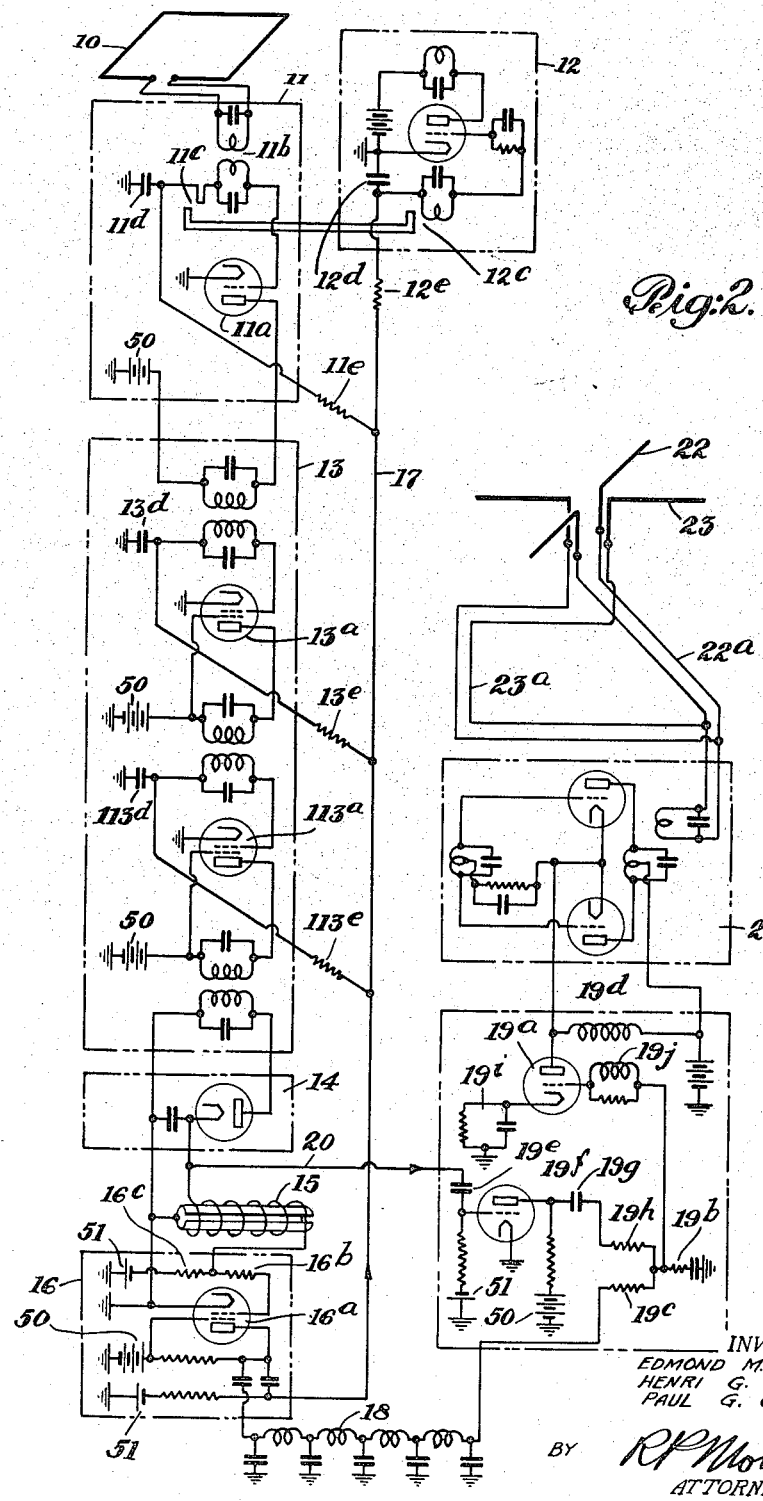
Fig. 2 is a more detailed circuit diagram of the apparatus represented in Fig. 1.

The apparatus designated in Figs. 1 and 2 is intended to be constructed in the form of a small unit weighing a very few pounds and capable of being carried on a small cellophane balloon of the type used in meteorological tests.

In general the function to be performed by this apparatus is as follows: First, to receive on a suitable receiving antenna a signal presumably in the form of a brief wave train of ultra-short waves; second, to re-radiate from a separate transmitting antenna a similar train with increased power after a brief delay. The increased power of re-radiation serves to compensate for the small pick-up area by the receiving antenna and the ratio of power increase should be so adjusted that the total power radiated in response to an arriving signal of given field strength is approximately equal to the total power which would be reflected from a warship of the type being protected in response to the same received field strength. The height of the apparatus above the water may be regulated by means of a small sea anchor or float suspended from the balloon and resting on the surface of the water. Preferably, such height should be approximately equal to the height of the portions of a battleship which first begin to produce a substantial reflection.

Referring more particularly to Fig. 1, 10 is a receiving antenna in the form of a horizontal loop. This loop supplies energy to a demodulator 11 of the so-called "mixer" type which also receives energy from an oscillator 12. The intermediate frequency energy produced in the demodulator 11 from the beating of the wave derived from the loop of the oscillator 12 is transmitted through intermediate frequency section 13 containing a plurality of intermediate frequency amplifier stages with tuning equipment of the band selection type. The intermediate frequency should be relatively high and the band selection equipment should be adapted to pass a relatively broad band so that the overall selectivity of the system will admit approximately plus or minus 1% of the carrier frequency, or even more. From the intermediate frequency section 13 energy is delivered to a second detector 14 after which the detector envelope is passed through a delay line 15 adjusted to give a delay of about 10 to 15 microseconds. This delay line may be adjustable or fixed; if it is fixed, it is preferable that the delay lines of different devices should have different delays so that the enemy cannot predict from experience the value of the delay which is probably being used in any given apparatus.

From the delay line 15 the wave is passed through an amplifier 16 which is preferably arranged to produce a limiting and clipping action (i.e., to suppress the upper and lower extreme portions of the wave by passing only the central portions thereof). If it is considered important to make the output or simulated echo fairly accurate, proportionate to the amplitude of the received wave, the amplifier 16 should not have a limiting action or, at least, should be adjusted so that such limiting action should not come into play with the signal strengths ordinarily expected. The clipping feature of the amplifier (which is ordinarily obtained by biasing it slightly below cut-off) may be retained even in such case in order to improve and sharpen the wave form which may have become rounded in transmission through the line 15.

The output from the amplifier 16 is divided into two parts, one portion being transmitted over a blocking channels 17 to disable the intermediate frequency section 13, the heterodyne detector 11, and the oscillator 12, while the other portion of the energy from the amplifier 16 is transmitted through a further delay line 18 to the impulse generator 19.

The impulse generator 19 is of a type disclosed in copending application Emile Labin, Serial No. 433,762, filed March 7, 1942. As will be briefly described in connection with Fig. 2, this impulse generator is adapted to produce very high voltage impulses of exceedingly brief duration by suddenly interrupting the current in an inductance coil. The energy delivered to the impulse generator 19 from the delay line 18 serves to initiate the abrupt cutting off of the current thus instantly causing the very high voltage brief impulse. Before such current-cutting action can be effected, however, a preparatory impulse must be delivered to initiate the flow of current through the inductance and such preparatory impulse must be received at least several microseconds before the control impulse from line 18. For this purpose an extra channel 20 is provided, as shown, to take a portion of the energy from the output of second detector 14 ahead of the delay line 15 and to transmit such energy directly to the impulse generator 19. If the delay in line 15 is 10 microseconds and the delay in line 18 is 3 microseconds, it will be seen that the preparatory control signal over channel 20 will arrive a little more than 13 microseconds ahead of the current terminating signal from delay line 18.

The high voltage brief impulses produced by the impulse generator 19 in response to the signals from delay line 18 are transmitted to modulated oscillator 21 where they are used in place of B supply thus serving not only to modulate the oscillator 21 but also to furnish the actual plate voltage for operation thereof. If the received signals are in the form of a brief train of ultra-high frequency waves (e.g., two or three microseconds wave train of waves in several hundred megacycles), the output from the modulated oscillator 21 will similarly be a two or three microseconds wave train of waves.

The modulated oscillator 21 is preferably arranged to be manually adjustable, and is tuned to approximately the frequency of the enemy's transmission before the apparatus is released, the oscillator 12 and the radio frequency stages of the detector 11 being tuned at the same time so as to efficiently receive the enemy's transmission. The output of modulated oscillator 21 is transmitted to a turnstile antenna comprising two crossed dipoles 22 and 23, the feed lines to the two dipoles being of unequal length so that these will be fed approximately 90° out of phase. By this means a rotating field is produced having substantially equal field strength in all directions.

Referring now to the more detailed showing of Fig. 2, it will be seen that the heterodyne detector 11 is of generally conventional construction except for connections to the grid of the tube 11a. This grid connection is arranged to take three signals in series, the first being the incoming signal from loop 10 which is applied over the secondary of doubly tuned transformer 11b, the second being the signal from oscillator 12 which is applied to a very low impedance inductive coupling 11c, and the third being a low frequency disabling signal applied to condenser 11d through a resistor 11e from blocking channel 17 as hereafter explained.

The oscillator 12 is an ordinary tuned plate, tuned grid oscillator but its grid is arranged to obtain bias through resistor 12e from the channel 17, being by-passed to ground through condenser 12d as shown. The output of this oscillator is taken by a specially tuned inductive coupling 12c, the secondary of which together with the primary of inductive coupling 11c, forms a low impedance link coupling arrangement.

The intermediate frequency section 13 is also of generally conventional type having all its transformers doubly tuned for wide-band selection characteristics. The tubes employed 13a and 113a are shown as tetrodes but may be pentodes or beam power tubes. The control grids of these tubes are by-passed to ground by condensers 13d and 113d and are connected to receive their C bias via resistors 13e and 113e from channel 17.

It will thus be seen that the detector 11, the oscillator 12, and both stages of the intermediate frequency section 13 are adapted to be blocked by the application of a strongly negative potential on channel 17. In order that no troublesome regeneration or unintended coupling shall be produced through the common channel 17, the resistors 11e, 12e, 13e and 113e should be made comparatively high in comparison with the reactance by the radio frequencies concerned of condensers 11d, 12d, 13d and 113d. In fact, the time constants defined by 11e and 11d by 12e and 12d, by 13d and 13e, and by 113d and 113e should be made as large as possible to minimize coupling difficulties. The upper limit of such time constants is set by the expected recurrence frequency of the wave trains to be received and relayed. If, for example, the equipment is to operate satisfactorily in relaying wave trains having a recurrence frequency of 5000 trains per second, each of the time constants above referred to should be short in comparison with 200 microseconds, in order that the negative block potential applied to disable the stages 11, 12 and 13 immediately after a wave train shall be substantially wholly dissipated at the time the next wave train arrives. In practice, it may be assumed that the enemy's apparatus will probably be designed with a recurrence frequency sufficiently low to enable him to perform radio ranging distances of 15,000 meters or more, thus necessitating an interval of 100 microseconds or more between wave trains. Upon this assumption the time contants of 11d, 11e, etc. may be made 30 microseconds each. With such time constants it is very easy to provide an adequate amount of decoupling between the different grids which receive their bias and their negative blocking pulses over channel 17.

The second detector 14 may be an ordinary diode detector as shown and the delay line 15 may be a concentrated line produced by coiling a wire around a slotted copper tube so as to provide comparatively large amounts of distributed inductance and capacitance per unit length. Amplifier 16 may be an ordinary amplifier using triodes, tetrodes or pentodes. For convenience, amplifier 16 is illustrated as employing a tetrode 16a which may be assumed to be either an ordinary tetrode or a beam power type of tetrode which attains the advantage of suppressor grid without the provision of such a grid.

A resistor 16b in the grid-lead of such amplifier will serve to produce a limiting effect by substantially preventing an increase of input voltage after the peak of grid current is reached.

A grid bias supply resistor 16c enables the grid to be biased from a C battery 51 as shown and such C bias is preferably sufficiently negative to bring the tube slightly below cut-off thus effecting a clipping action. As previously mentioned, the limiting resistor 16b may be omitted but preferably such a resistor is provided and the circuit is designed so that such resistor will not cause any limiting until the incoming signal is at such level as to overload the equipment. Thus, in a normal expectant operating range no limiting action will occur and the output will be roughly proportionate to the input except for the slight volume expanding action due to the clipping effect of the negative bias on the grid of 16a.

Delay line 18 is shown as a conventional artificial line although it may be of the same type as line 15. The output of this delay line 18 (which will be a brief negative pulse) is transmitted to the grid of tube 19a in the impulse generator 19, being applied to this grid through a voltage divider consisting of a fairly low resistor 19b and a higher decoupling resistor 19c. If, at this time, the tube 19a is conductive and is feeding a large current through inductance coil 19d the arrival of such negative pulse may, under certain conditions, initiate an action which results in quickly terminating the flow of current through tube 19a, thus causing inductance coil 19d to produce a short, high voltage surge. In order to understand more fully how this occurs it is convenient first to consider the operation of impulse generator 19 starting with the instant when the incoming wave train after detection in second detector 14 was applied to the delay line 15.

At the same time that the output from detector 14 is delivered to line 15 a portion of the energy thereof is delivered through coupling condenser 19e to the grid of an inverting and amplifying tube 19f, the output of which is in turn delivered through coupling condenser 19g to a voltage divider comprising the decoupling resistor 19h and the comparatively low resistor 19b. The pulse (which is positive after inversion in 19f) will bring the grid of tube 19a above the cut-off potential in spite of the negative bias applied to this grid from the c battery through resistor 19b (and the positive bias which may be, at this time, existing on the cathode by reason of a charge stored in the condenser of R-C circuit 19i, as hereafter explained). The space path of tube 19a therefore commences to pass current which flows through inductance coil 19d as well as through time constant circuit 19i (the latter being preferably of low impedance).

By inductive coupling grid coil 19j produces a positive surge on the grid which still further increases the conductivity of the space path. By such cumulative action the grid becomes almost instantly so positive that the space path has a negligible impedance compared to inductance coil 19d and thereafter the current rise is approximately linear, being limited almost wholly by the inductance of this coil. After the current has risen linear for about 10 to 15 microseconds the R-C circuit 19i will build up a positive charge. Preferably this circuit should be so proportioned that the charge built up would suddenly initiate the termination of the current in 19 or 25 microseconds. Thus, after 13 to 18 microseconds the cathode potential is near enough to the grid potential so that a reasonably moderate negative pulse of the grid will suffice to produce a substantial decrease in current.

When the pulse has traveled through delay line 15, amplifier 16 and further delay line 18, it is finally applied over voltage divider 19h—19b to the grid of tube 19a, as previously mentioned. At this time the grid is still strongly positive but the cathode has become sufficiently positive so that a reasonably moderate pulse can produce a substantial change in output current of the tube. The pulse arriving from line 18 has such an effect that it causes the current through the space path of tube 19a in series with inductance coil 19d to slightly decrease (or at least to somewhat increase in rate of decrease). Such a change, in turn, tends to make the grid of tube 19a more negative (or at least less strongly positive) through the transformer action and windings of 19d and 19j. This, in turn, further decreases the current which action renders the grid still more negative. Thus, in a very short interval of time, the current through the tube 19a is completely cut off producing a very high voltage surge across the winding 19d as well as a somewhat lower but still very substantial negative surge on its own grid.

After such abrupt cut-off of current the tube 19a remains below cut-off for some time since the positive charge applied to the filament by R-C circuit 19i requires some time to be fully dissipated. Preferably, the time constant of 19i should be short enough so that most of its charge leaks off in an interval corresponding to the shortest interval between wave trains in the signals which are expected from the enemy. In order that the tube shall not spontaneously re-start itself upon the dissipation of the charge from R-C circuit 19i, the negative C bias applied through resistor 19b is preferably sufficient to maintain the tube slightly below cut-off.

The surge of voltage from inductance coil 19d is applied across the cathode and anode of push-pull oscillator 21 thus serving as the anode supply for such oscillator. The oscillator 21 itself is a tuned grid, tuned plate oscillator of push-pull type whose construction is in itself well-known. The output in such oscillator is transmitted across the dipoles 22 and 23 over lines 22a and 23a, respectively, the length of these lines differing by 90 electrical degrees so as to produce quadrature excitation of the turnstile antenna 22—23.

Referring now more particularly to Fig. 3, a preferred self-destruction arrangement is shown. The single battery 50 which is shown in this figure is the same battery which, for convenience, is represented as a plurality of batteries all bearing the reference character 50 in Fig. 2.

Likewise, the C battery 51 of Fig. 3 is the same battery which is represented as a plurality of batteries all bearing the reference character 51 in Fig. 2.

The battery 52 in Fig. 3 is a filament heater battery which, for convenience, is not shown at all in Fig. 2. The base plate 53 of Fig. 3 is understood to be the reference point which is represented by the ground symbol in the circuit of Fig. 2.

The battery 50 may, for example, have a voltage of 210 volts when new, the battery 52 having 7 to 8 volts so as to overload a filament designed for 6.3 volts, and the battery 51 having a suitable voltage of a few volts as required by the characteristics of the tubes used. The battery 50 has a tap 54 disposed approximately 18 volts from the negative or grounded end of the battery, thus leaving 192 volts to the left of this tap. A resistor 55 and a high voltage gas-filled diode 56 are connected in series across the 217 volts provided by batteries 50 and 52, the connection extending through zigzag wire 57 and foil sheet 58 for reasons hereafter explained.

The diode 56 is preferably of the R.C.A. type known as V.R. 90 having a substantially constant voltage drop of 90 volts regardless of current between certain limits, and the resistor 55 is high enough so that the total current drawn is very small (e.g., a few milliamperes or less). Since the drop across tube 56 is 90 volts and the voltage of battery 52 and of the right-hand portion of battery 50 together make 25 volts, it will be clear that the voltage between the upper end of diode 56 and the tap 54 on battery 50 is 65 volts. This 65-volt potential is applied as shown between the cathode and starter of a three electrode, gas-filled tube 60, which is of a well-known type requiring about 70 volts for ionizing of the starting gap. The anode of this tube 60 is connected through a detonating filament 61 (which is fitted in a bursting charge 62) to the positive terminal of the battery 50. In order that the main gap between the cathode and the main anode of tube 60 shall not normally break down the tube should be of a type which will resist a voltage of 217 volts across such main gap. Under normal conditions with the new battery, therefore, the tube 60 will be deionized with a voltage of only 65 volts across its control gap and a maximum voltage of 217 volts between the main anode and the cathode.

As the batteries become depleted and decrease in voltage, however, the voltage of the right-hand portion of battery 50, together with filament battery 52, will decrease while the voltage drop across tube 56 will remain constant.

Thus the resulting potential difference between the cathode and starting anode of tube 60 will increase. Assume, for example, that all of the batteries are depleted to three-fifths of their normal voltage, then the resultant voltage produced by the battery 52 and of the right-hand portion of battery 50 taken together will be only 15 volts instead of 25 volts and the potential difference across the starting gap of tube 60 will be 75 volts, which is sufficient to cause ionization of this tube. Immediately upon commencing of such ionization the main gap will break down also and the current through filament 61 will fire the bursting charge 62, thus causing complete destruction of the whole impedance circuit as well as of the supporting balloon.

It will be understood that the potential values given for these various batteries are merely for the purposes of illustration. If it is desired to make battery 50 of greater voltage than can be withstood by the main gap of tube 60, the lead from filament 61 may be returned to a suitable tap on this battery. Likewise, it should be noted that although the circuit shown makes use of the two batteries 50 and 52 in series so as to be capable of causing detonation of the bursting charge in response to depletion of either one of these batteries the circuit can readily be modified so as to extend around battery 50 only, without including battery 52 in the circuit.

In order that any equipments which might fall into the enemy's hands prior to depletion of the batteries shall be protected from inspection the circuit of Fig. 3 is arranged to detonate the bursting charge in response to any attempt to open or tamper with the apparatus. For this purpose a zigzag wire 57 previously mentioned is molded into the plastic cover which houses the complete repeater circuit and, in addition, the metal base plate 53 which serves as a chassis for mounting the apparatus is provided with a foil sheet 58 insulated with a suitable insulating filament 65. The zigzag wire 57, which is molded in the cover, makes a connection to the remainder of the circuit by means of two spring contacts 66 and 67 which are disposed inside the plastic cover so as to be inaccessible until after the cover has been removed.

As will be clear, any attempt to remove the cover will necessitate opening either spring contact 66 or spring contact 67. Any attempt at drilling through or cutting the cover will break the continuity of zigzag wire 57 while any attempt to drill through the metal base plate 53 will short-circuit the latter to the foil sheet 58, which is disposed inside the chassis.

As will be clear from the circuit of Fig. 3, any opening of contacts 66, 67 or wire 57, or any rupture of foil sheet 58 will have the effect of throwing full voltage of the left-hand portion of battery 50 across the starting gap of tube 60, thus instantly causing detonation of the bursting charge. In similar fashion any shorting of foil sheet 58 against base plate 53 will have the effect of decreasing the voltage of battery 52 to zero so that the voltage across the starting gap will rise by 7 volts. If the voltage limits are closely adjusted this may be sufficient to fire the bursting charge. If such close adjustment is difficult the base plate 53 may be connected to a tap, such as tap 54, on battery 50. In such case the base plate would not be at ground potential since the ground potential in Fig. 2 is taken to be the potential of one side of the filamentary cathodes.

Referring now more particularly to Figs. 4 and 5 these show alternative antenna arrangements. The antenna arrangements of Figs. 1 and 2 were particularly adapted for horizontal polarization, being arranged to give essentially circular radiation patterns whereby no great change in sensitivity is produced by rotation around a vertical axis.

The antenna arrangements shown in Fig. 4, on the other hand, are adapted to produce similar circular radiation arrangements for vertical polarization. As shown, the receiving antenna of Fig. 4 comprises a pair of cross loops 70 and 71 connected to the repeater circuit by different length lines 70a and 71a while the transmitting antenna is a single vertical dipole 72.

The arrangement of Fig. 5 is particularly useful in cases where polarization of the enemy's transmission is not known or is variable by reason of an intentional change or for some other reason. In this arrangement three mutually perpendicular loops 74, 75, 76 are used for the receiving antenna, being connected through the repeater circuit by lines 74a, 75a and 76a. The line 74a is 60 electrical degrees longer than the line 76a, and the line 75a is 60 electrical degrees longer than the line 74a. The transmitting antenna of Fig. 5 comprises three mutually perpendicular dipoles 80, 81, 82 fed over variable length lines 80a, 81a and 82a. The variation in length between lines 80a and line 81a is 60 electrical degrees and similarly the variation in length between line 81a and line 82a is 60 electrical degrees whereby a rotating wave of universal polarization is emitted in such fashion as to give substantially the same energy in all horizontal directions and for all polarizations.

It will be noted that in every example illustrated the receiving antennae are of loop form and the transmitting antennae are of dipole form. This has the very great advantage of minimizing coupling between the transmitting and receiving antennae for a given degree of balance and remoteness. Ordinarily the two antennae cannot be very remote in a small compact unit such as one capable of being carried by a balloon. It is possible to dispose the antenna in balanced fashion so as not to interact but such balance cannot be perfect and is moreover readily disturbed by motion of the surface of the balloon or by varying proximity to the ground. Moreover, the problem of exactly balancing the two antennae so as not to interact is a difficult one and is further complicated when the frequency of operation is intended to be quickly adjusted at the time of putting the apparatus into use.

By making one antenna of the loop type whose nearby field is primarily magnetic while the other antenna is of the dipole type whose nearby field is mostly electro-static, interaction between the two antennae is very greatly reduced even without the need for arranging the antennae in any particular relative position. If, in addition, the antennae are arranged in such relative positions as to further reduce interaction the amount of pick-up of transmitted signals of the receiving antenna can be made very small.

It should be understood that although I have shown the loop antenna as used for reception while the dipole antennae are used for transmission, these relationships may be reversed so as to use the dipole antenna for reception and the loop for transmission. Preferably, however, the antenna used for reception should be of the opposite kind from the type used for transmission in respect of their ratio of electro-static to electro-magnetic influence. Thus antennae primarily having electro-static influence should be used for one array (i.e. receiving or transmitting) while antennae of the opposite type should be used for the other array.

Although in the preferred embodiment of the invention illustrated in Fig. 3 conductor 54 is tapped into battery 50 a sooner result may be achieved in the case of a battery not having facilities for tapping, by connecting a voltage divider across the battery and tapping the conductor 54 into such voltage divider. Wherever a conductor is spoken of as being effectively tapped into a battery therefore, such expression should be understood to include an arrangement wherein the tapping is formed with the assistance of a voltage divider across all or a part of the battery, or across the combination of the battery and some further battery.

In the preferred embodiment disclosed in Fig. 3 it will be noted that the B battery 50 and the filament battery 52 are considered together as one single battery for the purpose of the self-destruction equipment. Thus, the constant-drop tube 60 (which should preferably have a drop of the order of 90 volts) and the resistor 55 are connected in series with one another across the whole battery formed by the cells of 52 in series with the cells of 50, such connection being made by way of contacts 66 and 67, and zigzag wire 57, and foil sheet 58. As previously mentioned, the circuit could readily be modified to span only the battery 50 thus being independent of the voltage of battery 52. Alternatively, the circuit could span a portion of the battery 50 and all, or a part, or none, of the battery 52. Where a battery is referred to therefore it should be understood that the battery need not be one self-contained unit but may be any series connected battery of cells contained in one or more interconnected units.

In particular, it should be noted that the return lead from the main anode need not be connected to the same point as resistor 55. As previously mentioned, if the battery 50 is unduly large the return lead from the main gap of tube 60 in series with the firing filament 61 may be returned to a tap on battery 50 instead of to the end thereof. In such case resistor 55 could be returned to the same tap or to a different tap, or to the end of the battery. Furthermore, if the battery 50 is of such high voltage that the series combination of resistor 55 and tube 56 are spanned across only a part of the battery, the polarity of the battery could be reversed from that shown in Fig. 3 and the unused portion of the battery could be left extending to the right (i.e., beyond the positive end of the battery). In such case, the return lead from firing filament 61 may be returned to the right-hand end of the battery which would then be the positive end.

It will thus be seen from this discussion that the exact arrangement and polarity shown in Fig. 3 are not essential provided only that the voltage of some portion of the battery is opposed comparatively constant reference voltage drop obtained across gaseous diode 56, and that the difference between these two voltages so opposed is then made use of to ionize the gap of a additional tube. Preferably, the additional tube is a three element tube whose staring gap is arranged to be ionized by the voltage difference just mentioned. In such case, the main gap can conveniently be arranged to carry a comparatively large current for firing the bursting charge. It should be appreciated, however, that tube 60 could be made a diode, the firing filament being then connected in series with the lead 54. Such an arrangement might have the advantage of permitting the use of a smaller size gaseous tube for tube 60.

Although certain embodiments of the invention have been shown and described for purposes of illustration, it will be understood that adaptations, modifications and variations thereof, occurring to one skilled in the art, may be made without departing from the scope of the invention as defined in the appended claims.

What is claimed is:

1. Self-destruction equipment for destroying secret electrical apparatus to prevent inspection thereof which comprises a bursting charge disposed in destructive relationship to said apparatus, electrical firing means for detonating said charge in response to a flow of current therethrough, a battery connected to deliver current to said apparatus to be destroyed, a first conductor, a resistor connected from one end of said battery to said first conductor, a constant-drop, gas filled tube connected from the other end of said said battery to said first conductor whereby a reference voltage drop is produced between said first conductor and said other end of said battery, a second conductor effectively tapped into said battery at a point near said other end thereof whereby the potential difference of said second conductor with respect to said other end of said battery is smaller than said reference voltage drop, and means responsive to an increase in the potential difference between said first and second conductors to initiate a flow of current through said firing means.

2. Self-destruction equipment in accordance with claim 1, wherein said means for initiating a flow of current comprises a three element gaseous discharge tube having a starting gap and a main gap, means connected to said starting gap across said first and second conductors, means including said battery for applying to said main gap a potential sufficient to pass current therethrough in response to ionization of said control gap, and means connected to said firing means in series with said main gap.

3. Self-destruction equipment for destroying secret electrical apparatus to prevent inspection thereof which comprises a bursting charge disposed in destructive relationship to said apparatus, electrical firing means for detonating said charge in response to a flow of current therethrough, a source of power connected to deliver current to said apparatus to be destroyed, and control means responsive to an approximately predetermined decrease in the power received from said source to initiate a flow of current through said firing means.

4. A self-destruction equipment for destroying secret apparatus to prevent inspection thereof comprising a bursting charge disposed in destructive relationship to said apparatus, electrical firing means for detonating said charge in response to a flow of current therethrough, and control means for initiating a flow of current through said firing means after a predetermined time interval, said control means including conductor means arranged in such a relationship with respect to said apparatus that an attempt to inspect such apparatus is apt to alter the condition of said conductor means and thereby initiate a flow of current through said firing means.

5. A self-destructive equipment according to claim 4, wherein said conductor means includes a fragile conductor mounted in such relation to said apparatus as to be liable to breakage during an attempt to inspect said apparatus, and means responsive to breakage of said conductor for producing a flow of current through said firing means.

6. A self-destruction equipment according to claim 4, wherein said conductor means includes a pair of conductors insulated from each other and supported in such relation to said apparatus as to be liable to short circuiting during an attempt to inspect said apparatus, and means responsive to short circuiting of said two conductors for producing a flow of current.

7. A self-destruction equipment for destroying secret electrical apparatus to prevent inspection thereof comprising a bursting charge disposed in destructive relationship to said apparatus, electrical firing means for detonating said charge in response to a flow of current therethrough, a battery associated with the apparatus to be destroyed, and control means responsive to a predetermined decrease in the voltage of said battery for producing a flow of current through said firing means, said control means including means responsive to an attempt to inspect said apparatus for initiating a flow of current through said firing means.

8. A self-destruction equipment for destroying secret apparatus to prevent inspection thereof comprising a bursting charge disposed in destructive relationship to said apparatus, electrical firing means for detonating said charge in response to a flow of current therethrough, a power source connected to deliver current to said apparatus to be destroyed, and control means responsive to a decrease in the voltage of said power source to initiate a flow of current through said firing means.

9. A self-destruction equipment for destroying secret electrical apparatus to prevent inspection thereof comprising a bursting charge disposed in destructive relationship to said apparatus, electrical firing means for detonating said charge in response to a flow of current therethrough, control means including two elements responsive to a given potential value difference therebetween for initiating a flow of current through said firing means, means for providing a substantially constant voltage drop independent of variations in current flow therethrough, within limits, for applying to one of said elements a substantially constant potential greater than said given value and means for applying to the other of said elements a lesser potential than said given value, the difference between such greater and lesser potentials normally being less than said given value, whereby a decrease in the lesser potential results in an increase in the potential difference between said elements, said control means initiating a flow of current through said firing means when said potential difference is equal to or greater than said given value.

10. A self-destruction equipment for destroying secret electrical apparatus to prevent inspection thereof comprising a bursting charge disposed in destructive relationship to said apparatus, electrical firing means for detonating said charge in response to a flow of current therethrough, a gaseous discharge tube having at least two elements responsive to a given potential value difference therebetween for initiating a flow of current through said firing means, means for applying to one of said elements a greater potential than said given value, and means for applying to the other of said elements a lesser potential than said given value, the difference between such greater and lesser potentials normally being less than said given value, whereby a decrease in the lesser potential making the difference between said greater and lesser potentials equal to or greater than said given value causes said gaseous discharge tube to initiate flow of current through said firing means.

11. A self-destruction equipment for destroying secret apparatus to prevent inspection thereof comprising a bursting charge disposed in destructive relationship to said apparatus, electrical firing means for detonating said charge in response to a flow of current therethrough, a battery, control means including two elements responsive to a given potential value difference therebetween for initiating a flow of current from said battery through said firing means, means for applying a lesser potential than said given value from said battery to one of said elements, means for establishing from said battery a substantially constant potential greater than said value regardless of a substantial drop in battery voltage, means to apply said potential to the other of said elements, the difference between such greater and lesser potentials normally being less than said given value, whereby a decrease in the voltage of said battery sufficient to make the difference between said greater and lesser potentials equal to or greater than said given value causes said control means to initiate flow of current through said firing means.

12. A self-destruction equipment for destroying secret apparatus to prevent inspection thereof comprising a bursting charge disposed in destructive relationship to said apparatus, firing means for detonating said charge in response to a flow of current therethrough, a gaseous discharge tube having two elements responsive to a given voltage value difference therebetween for initiating a flow of current through said firing means, means to apply to one of said elements a potential from a battery of lesser value than said given value, a voltage regulator tube for applying from said battery to the other of said elements a substantially constant potential greater than said given value, the difference between said greater and lesser potentials normally being less than said given value, whereby a decrease in the battery voltage rendering the difference between said greater and lesser potentials equal to or greater than said given value causes said discharge tube to conduct and thereby initiate flow of current through said firing means.

References Cited in the file of this patent

UNITED STATES PATENTS

| | | |
|---|---|---|
| 1,313,129 | Smith | Aug. 12, 1919 |
| 1,755,023 | Ruhlemann | Apr. 15, 1930 |
| 1,807,708 | Ruhlemann | June 2, 1931 |
| 1,841,983 | Ruhlemann | Jan. 19, 1932 |
| 2,023,099 | Reiter et al. | Dec. 3, 1935 |